(12) United States Patent
Ohnishi (10) Patent No.: US 7,248,207 B2
(45) Date of Patent: Jul. 24, 2007

(54) SYSTEM AND METHOD FOR SIDELOBE REDUCTION USING POINT SPREAD FUNCTION EXPANSION

(75) Inventor: Katsumi Ohnishi, Centreville, VA (US)

(73) Assignee: Information Systems Laboratories, Inc., San Diego, CA (US)

( * ) Notice: Subject to any disclaimer, the term of this patent is extended or adjusted under 35 U.S.C. 154(b) by 357 days.

(21) Appl. No.: 11/092,367

(22) Filed: Mar. 29, 2005

(65) Prior Publication Data

US 2006/0227038 A1    Oct. 12, 2006

(51) Int. Cl.
*G01S 13/52* (2006.01)

(52) U.S. Cl. .................... 342/93; 342/90; 342/134; 342/135; 342/196; 342/128; 342/109

(58) Field of Classification Search .................. 342/93
See application file for complete search history.

(56) References Cited

U.S. PATENT DOCUMENTS

| | | | | |
|---|---|---|---|---|
| 4,566,011 A | * | 1/1986 | Lewis et al. | 342/201 |
| 4,608,566 A | | 8/1986 | Ennis et al. | |
| 5,229,775 A | * | 7/1993 | Sakamoto et al. | 342/160 |
| 5,583,517 A | | 12/1996 | Yokev et al. | |
| 5,596,330 A | | 1/1997 | Yokev et al. | |
| 5,760,732 A | * | 6/1998 | Marmarelis et al. | 342/145 |
| 5,828,306 A | | 10/1998 | Curran | |
| 5,943,006 A | * | 8/1999 | Crane et al. | 342/196 |
| 5,955,989 A | | 9/1999 | Li | |
| 6,078,289 A | | 6/2000 | Manoogian et al. | |
| 6,313,783 B1 | | 11/2001 | Kuntman et al. | |
| 6,724,340 B1 | | 4/2004 | Carlos et al. | |

OTHER PUBLICATIONS

Rao, N.A.H.K. et al. "Evaluation of a Pulse Coding Technique for Speckle Reduction and Structure Characterization". Ultrasonics Symposium, 1993. Proceedings., IEEE Oct. 31, 1993-Nov. 3, 1993. vol. 2. pp. 1175-1180.*

* cited by examiner

*Primary Examiner*—Thomas H. Tarcza
*Assistant Examiner*—Matthew M Barker
(74) *Attorney, Agent, or Firm*—Nydegger & Associates (57) ABSTRACT

Systems and methods for detecting targets using pulse-compressed radar signals are disclosed. In one application, relatively small targets that are masked by the time-sidelobes of a larger target's return signal can be detected. The methods include a signal expansion type algorithm that is used to process the pulse-compressed return signal. Specifically, a generalized Fourier expansion expression having a summation of PSF terms is used to expand the pulse-compressed signal. Each term represents a respective target and includes a point spread function and a complex coefficient. The signal expansion procedure can be used to determine a set of optimum complex coefficients, with one coefficient for each range bin. Doppler frequency can be used together with range to optimize the complex coefficients. Next, targets are detected by analyzing each range bin to determine whether the corresponding complex coefficient has an absolute magnitude greater than a pre-determined threshold.

20 Claims, 5 Drawing Sheets

SYSTEM AND METHOD FOR SIDELOBE REDUCTION USING POINT SPREAD FUNCTION EXPANSION

The U.S. Government has a paid-up license in this invention and the right in limited circumstances to require the patent owner to license others on reasonable terms as provided for by the terms of Contract No. F30602-03-C-0240 awarded by the Missile Defense Agency, Rome AFRL/SNR.

FIELD OF THE INVENTION

The present invention pertains generally to radar systems and methods for detecting a plurality of closely spaced targets. More particularly, the present invention pertains to systems and methods that use pulse-compressed radar signals for target detection. The present invention is particularly, but not exclusively, useful for detecting a relatively small target that is located in close proximity to a relatively large target.

BACKGROUND OF THE INVENTION

Pulse radar systems are capable of detecting remote targets and measuring the position (e.g. range), the radar cross section (i.e. size) and the velocity of the detected targets. When pulsed signals are used, the time period corresponding to the round trip travel of the pulse can be used to calculate target range. When pulses having relatively long pulse durations are employed, it is often difficult to detect and accurately calculate the range of two or more closely spaced targets. Specifically, with long pulses, the scattered returns from closely spaced targets overlap, preventing the return signals from being properly distinguished.

Short pulses, on the other hand, can be used to resolve closely spaced targets. However, with the use of short pulses, pulse energy becomes a consideration. Indeed, all other things being equal, a short pulse has less energy than a long pulse. When pulses having insufficient energy are used, the return signals produced have a correspondingly low energy, and cannot be detected. One reason pulse energy becomes important when contemplating the use of short pulses, is that radar systems are limited in terms of peak power. As a consequence, these radar systems, by themselves, cannot produce a short pulse having sufficient energy to detect relatively small targets.

Pulse compression is a technique that can be used to reduce the duration of a pulse while maintaining a relatively large pulse energy. Thus, pulse compression can be used to effectively produce short pulses having sufficient energy to detect relatively small targets. Typically, modern pulse compression techniques introduce a wideband, coded modulation into the pulse. Examples of this wideband modulation include linear frequency modulation and pseudo-random phase modulation.

When a coded pulse encounters a target, a scattered signal containing the code (or a variation thereof) is created. This scattered signal is then received and processed to locate the code within the scattered return signal data. For this purpose, the correlation property of the code can be used. More specifically, a correlation function defined by $$r(k) = \sum_{l=1}^{N} c(k-l)c(l)$$

can be used to find a so-called "zero offset" between the code and the correlation function. The location of this "zero offset" results in a peak when pulse power (usually measured in db) is plotted against range. This peak is indicative of the target range. Unfortunately, during this process, so-called "time-sidelobes" are created and show up together with a peak in the pulse-compressed signal. Oftentimes, the time-sidelobes of a relatively large target's return signal mask the peak of a relatively small target's signal return. In the absence of a suitable technique to overcome this problem, small targets that are in close proximity of a large target may be undetectable.

In light of the above, it is an object of the present invention to provide radar systems and methods suitable for the purposes of detecting a plurality of closely spaced targets of differing radar cross section. It is another object of the present invention to provide radar systems and methods for detecting a relatively small target having a return signal that is masked by the time-sidelobe of a relatively large target's return signal. Yet another object of the present invention is to provide radar systems and methods for detecting targets which are easy to use, relatively simple to implement, and comparatively cost effective.

SUMMARY OF THE INVENTION

The present invention is directed to radar systems and methods for detecting targets using pulse-compressed signals. In one application, the systems and methods can be used to detect one or more relatively small targets in a target area whose radar return signals are masked by the radar return signal created by a relatively large target in the same target area. More specifically, the present invention can be used to detect a target whose return signal is masked by the time-sidelobes of another target's return signal.

For the present invention, the system includes a radar transmitter for generating and transmitting one or more coded pulse signal(s). Each pulse signal is typically modulated with a pre-selected waveform. For example, the signal can be modulated with a pseudo-random coded waveform, or alternatively, a linear frequency modulated (e.g. chirped) waveform can be used. For the system, the transmitter is oriented to direct at least one pulse toward a targeted area. At the targeted area, the transmitted signal is scattered by each target located in the target area. This scattered signal is then received and pulse-compressed by a receiver. Next, the pulse-compressed signal can be processed to detect the targets.

In greater detail, for the present invention, a signal expansion type algorithm is used to process the pulse-compressed signal. Specifically, a generalized Fourier expansion expression is used to expand the pulse-compressed signal. In particular, the expansion expression used is a summation of terms of point spread functions (PSFs), with each term representing a potential target. More particularly, each term in the expansion expression includes both a PSF and a complex coefficient. For the algorithm, each PSF can be characterized as having a peak and accompanying time-sidelobes. In addition, each complex coefficient typically includes both a phase component and an amplitude component.

In accordance with the mathematics described later herein, a signal expansion algorithm can be used to determine a set of optimum complex coefficients, with one coefficient for each range bin. In some implementations, portions of the algorithm can be calculated off-line. Next, each range bin is analyzed to determine whether the corresponding complex coefficient has an amplitude greater than a pre-determined threshold. For this purpose, a constant false alarm rate (CFAR) technique can be used. For the case where the amplitude of complex coefficient exceeds the threshold, a target is detected at the range bin. Once a target is detected, the target's radar cross section can be calculated.

In some implementations of the present invention, Doppler frequency is used together with range to optimize the complex coefficients. In greater detail, for Doppler filtered return signals, the PSF for use in the expansion expression is generated in two-dimensional (range×Doppler) space. For these implementations, the present invention allows the target velocity to be calculated (in addition to target size and location). In addition, certain embodiments of the present invention are disclosed which can reduce Doppler filter sidelobes without increasing mainlobe width, and as a consequence, increase target detection accuracy.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
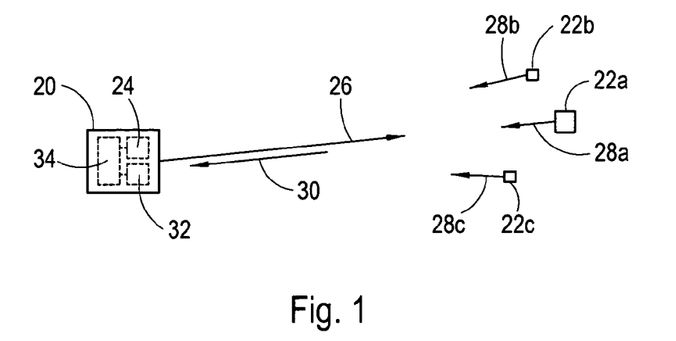
FIG. 1 is a schematic of a radar system for detecting a plurality of targets.

Referring to FIG. 1, a radar system 20 is shown for detecting a plurality of targets, such as exemplary targets 22a-c shown. Although three targets 22a-c are shown in FIG. 1, it is to be appreciated that more than three and as few as one target 22 can be detected with the system 20. As further shown in FIG. 1, the radar system 20 can include a radar transmitter 24 configured to generate and transmit a coded pulse signal 26. The transmit signal 26 typically consists of a pulse train having one or more pulses. For the system 20, the transmit signal 26 can be modulated with a pre-selected waveform. Suitable waveforms can include, but are not necessarily limited to: 1) a pseudo-random coded waveform, and 2) a linear frequency modulated (LFM) (e.g. chirped) waveform.

Continuing with FIG. 1, it can be seen that the transmitted signal 26 is scattered by each target 22a-c generating a respective target scatter signal 28a-c. These scatter signals 28a-c combine to create a return signal 30. For the system 20, the return signal 30 is then received by a receiver 32 and pulse-compressed. Once pulse-compressed, the signal is ready for subsequent processing (e.g. by processor 34). Although the system 20 is shown having a receiver 32 that is collocated with the transmitter 24, it is to be appreciated that this arrangement is merely exemplary. As an alternate to this collocated arrangement, the skilled artisan will quickly gather that an operational system 20 can be prepared wherein portions of the receiver 32 and transmitter 24 are common (i.e. a transceiver) or that the system 20 can be configured as a bistatic radar (i.e. having a receiver 32 that is distanced from the transmitter 24).

Figure 2A:
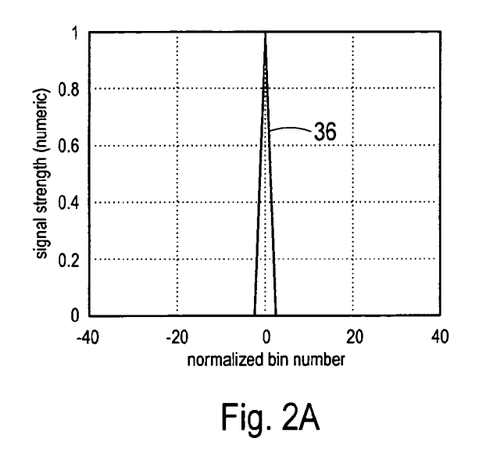
FIG. 2A illustrates a delta function representing a point source of unit strength placed at the $0^{th}$ range bin.
Figure 2B:
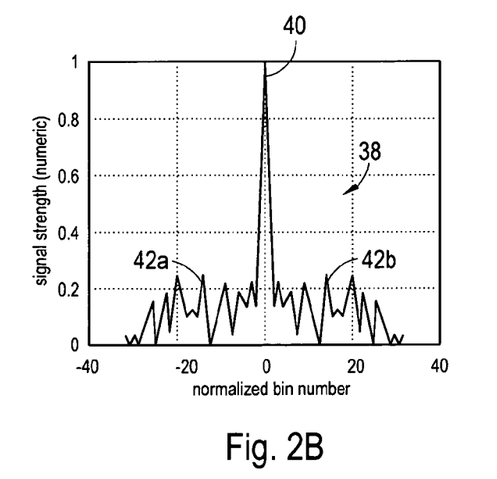
FIG. 2B illustrates a compressed pulse shape generated from the delta function shown in FIG. 2A using a bi-phase code consisting of 32 chips.

For the system 20, each target 22a-c is considered to consist of point sources/scatterers. FIG. 2A shows a delta function 36 representing a point source of unit strength placed at the $0^{th}$ range bin. A corresponding compressed pulse shape generated using a bi-phase code consisting of 32 chips is shown in FIG. 2B. As seen there, the operation of pulse-compression spreads out a point source represented by the delta function 36 (FIG. 2A) to a point spread function 38 that can be characterized as having a single peak 40 at the target location and accompanying time-sidelobes 42a,b.

For the system 20, it can be assumed that targets 22a-c consist of a collection of point scatterers. As a consequence, the pulse-compressed return signal 30 can be considered to represent a summation of shifted and scaled PSFs, with one PSF for each target 22a-c. Functionally, for the system 20, the pulse-compression operation is performed to recover the corresponding delta function 36 for each target 22a-c from the summation of scaled and shifted PSFs in the return signal 30. Specifically, assuming that the compressed radar signal is a summation of shifted and scaled PSFs, a post-compressed radar signal y(r) can be expressed as:

$$y(r) = \sum_{k=1}^{N_T} a_{T_k} p(r - r_{T_k}). \tag{1}$$

where r denotes the range bin index, p(r) is the PSF and there are $N_T$ targets of complex-valued amplitudes $\{a_{T_k}\}$ at range bins $\{r_{T_k}\}$. Equation (1) requires that range bin $\{r_{T_k}\}$ and the corresponding amplitudes $\{a_{T_k}\}$ for the unknown targets be specified.

This problem can be resolved by first expanding y(r) into the base functions $p(r-r_k)$, k=1, 2, ..., N. Since target locations are not known, a sufficiently large number of locations $\{r_k\}$ can be selected so that the target range bins $\{r_{Tk}\}$ are included in $\{r_k\}$. The case where the set of $\{r_k\}$ are smaller compared to the target range bins $\{r_{Tk}\}$ is discussed in greater detail below.

Thus, the terms $\{a_k\}$ are computed that satisfy:

$$\min_{\{a_x\}} \sum_r \left| y(r) - \sum_k a_k p(r - r_k) \right|^2 \tag{2}$$

The optimization generates $\{a_k, r_k\}$ pairs. Next, a threshold detection rule is applied to $|a_k|$ to determine if a target is present at the $r_k^{th}$ range bin.

Equation (2) is regarded as a generalization of a Fourier expansion where optimizing $\{a_k\}$ is computed by:

$$\min_{\{a_k\}} \left| y(r) - \sum_k a_k e^{i2\pi f_k r} \right|^2 \qquad (5)$$

To proceed with the optimization (i.e. equation (2)), define:

$$p(r) = [p(r-r_1) p(r-r_2) \ldots p(r-r_N)]^T, \qquad (3)$$

and $$a = [a_1 a_2 \ldots a_N]^T. \qquad (4)$$

Using equation (3) and equation (4), equation (2) can be written as:

$$\min_a \sum_r |y(r) - a^T p(r)|^2. \qquad (5)$$

Setting the Gateaux differential of equation (5) to zero, the optimum a is computed by:

$$a = \left( \left( \sum_r p(r) p(r)^H \right)^{-1} \sum_r p(r) y^*(r) \right)^* \qquad (6)$$

where ( )* denotes the complex conjugation. See, for example, D. G. Leuenberger, *Optimization by vector space methods*, John Wiley & Sons, Inc., New York, 1969.

A point spread function may be understood as an approximation to the Dirac delta function and satisfies: $\Sigma p^*(r-r_i) p(r-r_j) = 0$ if $i \neq j$. This implies that $p(r-r_k)$ are functions of almost mutual orthogonality. Thus, it can be assumed that $p(r-r_k)$ forms a basis and $$\sum_r p(r) p(r)^H$$

may be assumed to be non-singular.

The system 20 can also be configured to incorporate the effects of Doppler frequency shifts that are caused by the movements of the targets 22a-c. For this configuration of the system 20, moving targets are characterized not only by amplitude and phase but also by Doppler frequency. In general, to accommodate these characteristics (i.e. amplitude, phase and Doppler frequency) the above-described curve-fitting methods can be used by generating point spread functions in two-dimensional range×Doppler space.

Mathematically, the Doppler shift can be computed as:

$$f_d = -\frac{2v}{c} f_c.$$

where v is the target radial speed and $f_c$ is the radar frequency. In addition, the pseudo-code received by a radar is modulated by the target as:

$$c_R(rT_c) = c(rT_c) \exp(i 2\pi f_d r T_c) \qquad (7)$$

where $T_c$ is the chip interval and r denotes the range bin index. For simplicity of notation, $T_c$ can be dropped as long as it does not cause confusion. The corresponding PSF can then be computed as a convolution of $c_R(r)$ with $c(r)$:

$$p_f(r) = c_R(r) c(r) \qquad (8)$$

where the suffix f of the PSF indicates the dependence on Doppler frequency.

Below, the implementation of the system 20 accounts for Doppler effects. In this implementation, point spread functions corresponding to targets are generated in two-dimensional range×Doppler space. It is to be appreciated and understood that this implementation is merely exemplary, and those skilled in the pertinent art can routinely extend the teachings provided herein to other Doppler filtering schemes using PSFs that are generated in two-dimensional range× Doppler space.

Since AEGIS SPY-1 radars typically use a pseudo-random coded waveform, a pseudo-random coded waveform is considered here. It is to be appreciated that the algorithm described herein can also be extended to LFM radar waveforms without difficulty.

In order to make the derivation applicable to general pulse-compression techniques, a complex notation is used to represent a code: $\exp(j\phi(r))$, where $\phi(r)$ denotes the phase at the $r^{th}$ chip. For a bi-phase coding system, $\phi(r)$ may be set to either 0 or $\pi$.

For a target with Doppler frequency shift $f_D$, the returned pulse may be represented as $$s(r) = \exp(j 2\pi f_D r) \exp(j \phi(r)) \qquad (9)$$

where a signal of unit power is assumed for simplicity. In equation (9), the effects of the carrier frequency can be ignored assuming an appropriate downconversion followed by filtering. Also, the sampling interval has been suppressed in equation (9). Further, in equation (9), the term, $\exp(j 2\pi f_D r)$, represents the effect of target Doppler in a pulse.

In this implementation, the system 20 can be configured for processing a return signal that has been Doppler filtered using what is commonly called conventional Doppler filtering. This conventional Doppler filtering technique typically requires multiple pulses in a coherent pulse interval (CPI).

For the implementation in which the system 20 is used with conventional Doppler filtering, the post-compressed radar signal of the $n^{th}$ pulse at the $r^{th}$ range bin, y(r, n), is weighted and a fast Fourier transform (FFT) is applied:

$$\hat{y}(r,m) = \sum_{n=0}^{M-1} w(n) y(r,n) \exp\left(-i \frac{2\pi}{M} nm\right), \qquad (10)$$

where $\{w(n)\}$ denote weights that are used to reduce high sidelobes associated with a FFT and M is the number of pulses.

Following equation (9), above, the target return for the $n^{th}$ pulse at the $r^{th}$ range bin can be represented as:

$$p_{f_D}(r,n) = \exp(j 2\pi n T_P f_D) \exp(j 2\pi f_D r) \exp(j \phi(r)) \qquad (11)$$

A pulse is compressed in the Doppler filtering technique using the code sequence, $\exp(j\phi(r))$. Thus, a point spread function can be computed as:

$$p_{f_D}(r,n) = \exp(j 2\pi n T_P f_D) \exp(j 2\pi f_D r) \exp(j \phi(r)) \exp(j \phi(r)).$$

The target frequency $f_D$ can be restricted to those of integer multiples of $1/(MT_P)$ as usually assumed in Doppler filtering, i.e., $f_D=m_D(MT_P)$ for some integer $m_D$, $m_D=0, 1, 2, \ldots, M-1$. Under this assumption, the number of PSFs to be used in the RCM processing can be reduced to M. Substituting $f_D=m_D/(MT_P)$ into (12), leads to:

$$p_{m_D}(r, n) = \exp\left(j\frac{2\pi}{M}nm_D\right)\left[\left(\exp\left(\frac{2\pi}{MT_P}m_D r\right)\exp(j\phi(r))\right) \otimes \exp(j\phi(r))\right] \quad (13)$$

where the subscript $m_D$ is used to indicate the dependence of the PSF on target Doppler frequency. The PSF of equation (13) is herein named "time-PSF" to avoid confusion.

A two-dimensional PSF can be computed by replacing $y(r, n)$ in equation (10) with $p_{m_D}(r, n)$:

$$\hat{p}_{m_D}(r, m) = \sum_{n=0}^{M-1} w(n) p_{m_D}(r, n) \exp\left(-j\frac{2\pi}{M}nm\right). \quad (14)$$

In order to distinguish this PSF from the PSF of equation (6), $\hat{p}_{m_D}(r,m_D)$ is named a "Doppler-PSF." A Doppler-PSF may be pre-computed given a basic PSF (i.e. a PSF generated under the assumption of zero Doppler frequency), the number of pulses and FFT size.

For the special case where $w(n)=1$, $n=0, 1, 2, \ldots, N$, substituting equation (13) into equation (14) yields:

$$\hat{p}_{m_D}(r, m) = \begin{cases} M\left[\left(\exp\left(j\frac{2\pi}{MT_P}m_D r\right)\exp(j\phi(r))\right) \otimes \exp(j\phi(r))\right] & \text{if } m = m_D \\ 0 & \text{if } m \neq m_D \end{cases}$$

Note: such an orthogonality condition does not generally hold if $w(n) \neq 1$.

Figure 3A:
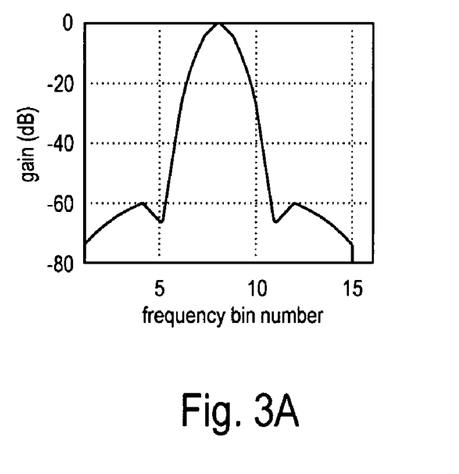
FIG. 3A shows a cross-section through a two dimensional range×Doppler PSF, showing a section parallel to the Doppler frequency axis.
Figure 3B:
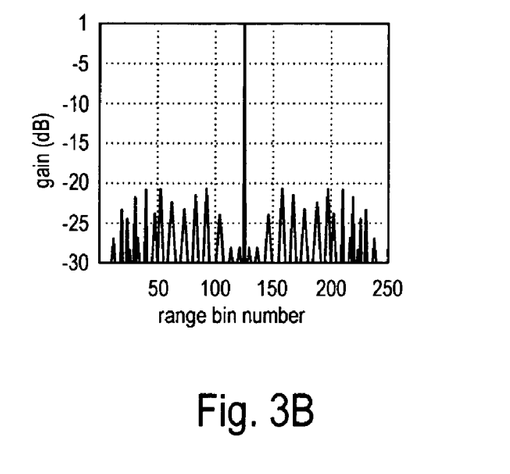
FIG. 3B shows a cross-section through a two dimensional range×Doppler frequency PSF, showing a section parallel to the range axis.

Referring now to FIGS. 3A and 3B, it can be seen that the cross-cut of a Doppler-PSF along range typically looks exactly like a one-dimensional PSF (see e.g. FIG. 2B), while the cross-cut along frequency looks like a conventional Doppler filter, i.e. has a wide beamwidth in frequency.

In some cases, the detection and estimation of target Doppler by the system 20 may depend on the level of sidelobes of Doppler filters. Several techniques were developed to resolve this issue. These techniques can mitigate sidelobes of Doppler filters without increasing mainlobe width and without increasing the number of transmitted pulses, thereby conserving radar resources.

The optimization of equation (2), which only takes into account range, can be modified to include target Doppler frequency. Specifically, for targets with Doppler, the optimization of equation (2) can be extended to the two-dimensional Range×Doppler space:

$$\min_{\{a_{k,m_D}\},\{r_k\}} \sum_{r,m} \left| \hat{y}(r, m) - \sum_{k,m_D} a_{k,m_D} \hat{p}_{m_D}(r - r_k, m) \right|^2 \quad (15)$$

and $p(r)$ of equation (3) can be modified to:

$\hat{p}(r,m) = [\hat{p}_0(r-r_1,m) \ldots \hat{p}_0(r-r_N,m)\hat{p}_1(r-r_1,m) \ldots$
$\hat{p}_1(r-r_N,m) \ldots \hat{p}_{M-1}(r-r_1,m) \ldots \hat{p}_{M-1}(r-r_N,m)]^T$ where the argument $r$ denotes the range bin index and $m$ the Doppler filter index.

Paralleling equation (6) for two-dimensional Range×Doppler space, the optimum "amplitude" vector, $a$, is computed by:

$$a = \left(\left(\sum_{r,m} \hat{p}(r, m)\hat{p}(r, m)^H\right)^{-1} \sum_{r,m} \hat{p}(r, m)\hat{y}^*(r, m)\right)^*$$

For the two-dimensional generalized Fourier transform approach, approximately 1000×1000×16 PSF functions are typically used to cover a region consisting of 1000 range bins and 16 Doppler frequency bins. To compute a correlation function of $\hat{p}(r,m)$, approximately $(1000 \times 1000 \times 16)^2/2$ complex multiplications and additions are performed.

In some implementations of the system 20, this computational load can be reduced. Specifically, an algorithm can be used in which each Doppler filter output is optimized only in range, $\{a_{k,m_D}\}$, rather than optimizing in both range and Doppler domains as in equation (15). This optimization algorithm is defined by:

$$\min_{\{a_{k,m_D}\}} \sum_r \left| \hat{y}(r, m_D) - \sum_k a_{k,m_D} \hat{p}_{m_D}(r - r_k, m_D) \right|^2 \quad (16)$$

where $\{r_k\}$ denotes a set of pre-determined range bins.

For the system 20, Doppler-PSFs for a chip interval $T_c$, a PRI of $T_p$, and M pulses can be generated by first assuming a Doppler frequency index, $m_D$ where $m_D=0, 1, 2, \ldots, M-1$. Next, the corresponding time-PSF according to equation (13) for M pulses is calculated. Appropriate weights at each range bin and a fast Fourier transform (FFT) are then applied. The data corresponding to the $m_D^{th}$ Doppler filter is retained and these steps are repeated to generate Doppler-PSFs.

The optimum target amplitude vector can be computed for the $m^{th}$ Doppler filter by:

$$a_m = \left(\left(\sum_r \hat{p}(r, m)\hat{p}(r, m)^H\right)^{-1} \sum_r \hat{p}(r, m)\hat{y}^*(r, m)\right)^* \quad (17)$$

Figure 4:
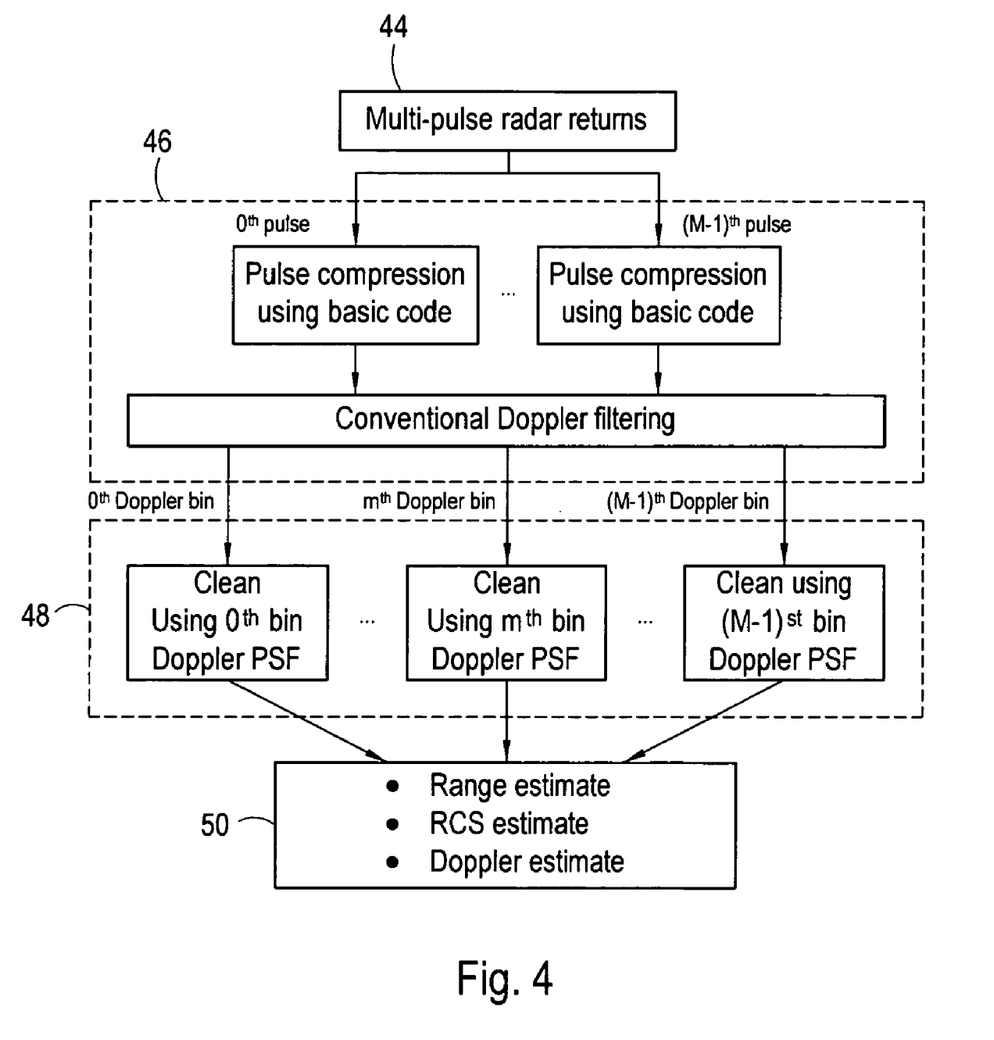
FIG. 4 shows a flowchart architecture for employing the Generalized Fourier Transform procedure with the conventional Doppler filtering.

The signal flow diagram for processing using the Doppler-PSF is shown in FIG. 4. Specifically, as shown, multi-pulse radar data (box 44) is received and processed by a radar system using conventional Doppler filtering (box 46). Specifically, in box 46, pulse compression using basic code (i.e. transmitted pulse code) is performed on each of M pulses. Next, each Doppler filter output (i.e. Doppler bins {0-(M-1)} are individually optimized only in range (box 48), resulting in optimized coefficients $\{a_{k,m_D}\}$. These coefficients are then used to identify target range, size and velocity (box 50).

The Generalized Fourier Transform method described above typically involves the computation of the covariance matrix of Doppler-PSFs and its inverse. As observed in equation (16), the Doppler-PSFs depend on relative distance $r-r_k$ and do not depend on the specific locations of the targets. Accordingly, in one implementation of the system 20, the covariance and its inverse can be computed off-line. For this method, however, correlation between the Doppler-PSFs $\hat{p}(r,m)$ and radar data $\hat{y}^*(r,m)$ as indicated in equation (17) is computed. This implementation is named the Block Generalized Fourier Transform procedure.

In some cases, the system 20 can be used to reduce Doppler filter sidelobes. For example, consider a radar that employs M pulses with PRI being equal to Δt. If an M-point Fast Fourier Transform is used for Doppler filtering, the response of a point scatterer having Doppler frequency of $m_D \Delta f$ can be represented as:

$$\hat{q}_{m_D}(m) = \sum_{n=0}^{M-1} w(n) \exp(j2\pi n \Delta t m_D \Delta f) \exp\left(-j\frac{2\pi}{M} nm\right)$$

where Δf denotes the frequency resolution. Now, since Δt=1/(MΔf) holds (see for example A. V. Oppenheim and R. W. Schafer, Digital Signal Processing, Prentice-Hall, New Jersey, 1975), it follows that:

$$\hat{q}_{m_D}(m) = \sum_{n=0}^{M-1} w(n) \exp(j2\pi n m_D) \exp\left(-j\frac{2\pi}{M} nm\right). \quad (18)$$

An example of such a function is shown in FIG. 3A. Specifically, $\hat{q}_{m_D}(m)$ can be interpreted as a point spread function in the frequency domain since a point scatterer located at frequency $m_D$ is spread out as shown in FIG. 3A. It can also be shown that $\{\hat{q}_{m_D}, m_D = 0, 1, \ldots, M-1\}$ are linearly independent.

In another implementation of the system 20, Doppler sidelobes are reduced by applying the Generalized Fourier Transform directly in the Doppler domain. For instance, equation (18) represents the response of a point scatterer having Doppler frequency of $m_D \Delta f$ when an M-point FFT is used for M pulse radar returns. If a $\tilde{M}$-point FFT ($\tilde{M} > M$) is used for Doppler filtering, the response of a point scatterer can be represented as:

$$\tilde{q}_k(m) = \sum_{n=0}^{M-1} w(n) \exp\left(j\frac{2\pi}{\tilde{M}} nk\right) \exp\left(-j\frac{2\pi}{\tilde{M}} nm\right). \quad (19)$$

Letting $\hat{y}(r,m)$, $m = 0, 1, \ldots, \tilde{M}-1$, be a cut along the Doppler axis at the $r^{th}$ range bin, for the Generalized Fourier Transform method in the Doppler domain, $\hat{y}(r,m)$ can be expanded using $\tilde{q}_{m_D}(m)$, $m_D = 0, 1, \ldots, \tilde{M}-1$, as basis functions:

$$\min_{\{\tilde{a}_k\}} \sum_{m=0}^{\tilde{M}-1} \left| \hat{y}(r, m) - \sum_{k=0}^{\tilde{M}-1} \tilde{a}_k \tilde{q}_k(m) \right|^2. \quad (20)$$

The optimum solution can formally be given by:

$$\tilde{a}_m = \left( \left( \sum_m \tilde{q}(m) \tilde{q}(m)^H \right)^{-1} \sum_m \tilde{q}(m) \hat{y}^*(r, m) \right)^*  \quad (21)$$

where $$\tilde{q}(m) = [\tilde{q}_0(m) \tilde{q}_1(m) \ldots \tilde{q}_{\tilde{M}-1}(m)]^T. \quad (22)$$

The formal solution for equation (21) is not valid if $\tilde{M} > M$, since $$\sum_m \tilde{q}(m) \tilde{q}(m)^H$$

is not invertible. In fact, it can be shown that the rank of $$\sum_m \tilde{q}(m) \tilde{q}(m)^H$$

is equal to M, the number of pulses. It can be seen by applying singular value decomposition (see for example R. A. Horn and C. R. Johnson, *Matrix Analysis*, Cambridge University Press, 1999) that the M primary singular values and corresponding singular vectors of $$\sum_m \tilde{q}(m) \tilde{q}(m)^H$$

can be used to define its inverse:

$$\left( \sum_m \tilde{q}(m) \tilde{q}(m)^H \right)^{-1} = U_1 \Sigma_1^{-1} U_1^H \quad (23)$$

where $\Sigma_1$ is a diagonal M×M matrix whose diagonal elements are the M primary singular values of $$\sum_m \tilde{q}(m) \tilde{q}(m)^H$$

and $U_1$, a $\tilde{M} \times M$ matrix, consists of the corresponding M singular vectors. Instead of equation (21), the optimum $\tilde{a}_m$ vector can be computed as:

$$\tilde{a}_m = \left( U_1 \Sigma_1^{-1} U_1^H \sum_m \tilde{q}(m) \hat{y}^*(r, m) \right)^*. \quad (24)$$

For the system 20, the pseudo-inverse $U_1 \Sigma_1^{-1} U_1^H$ can be computed off-line.

Figure 5:
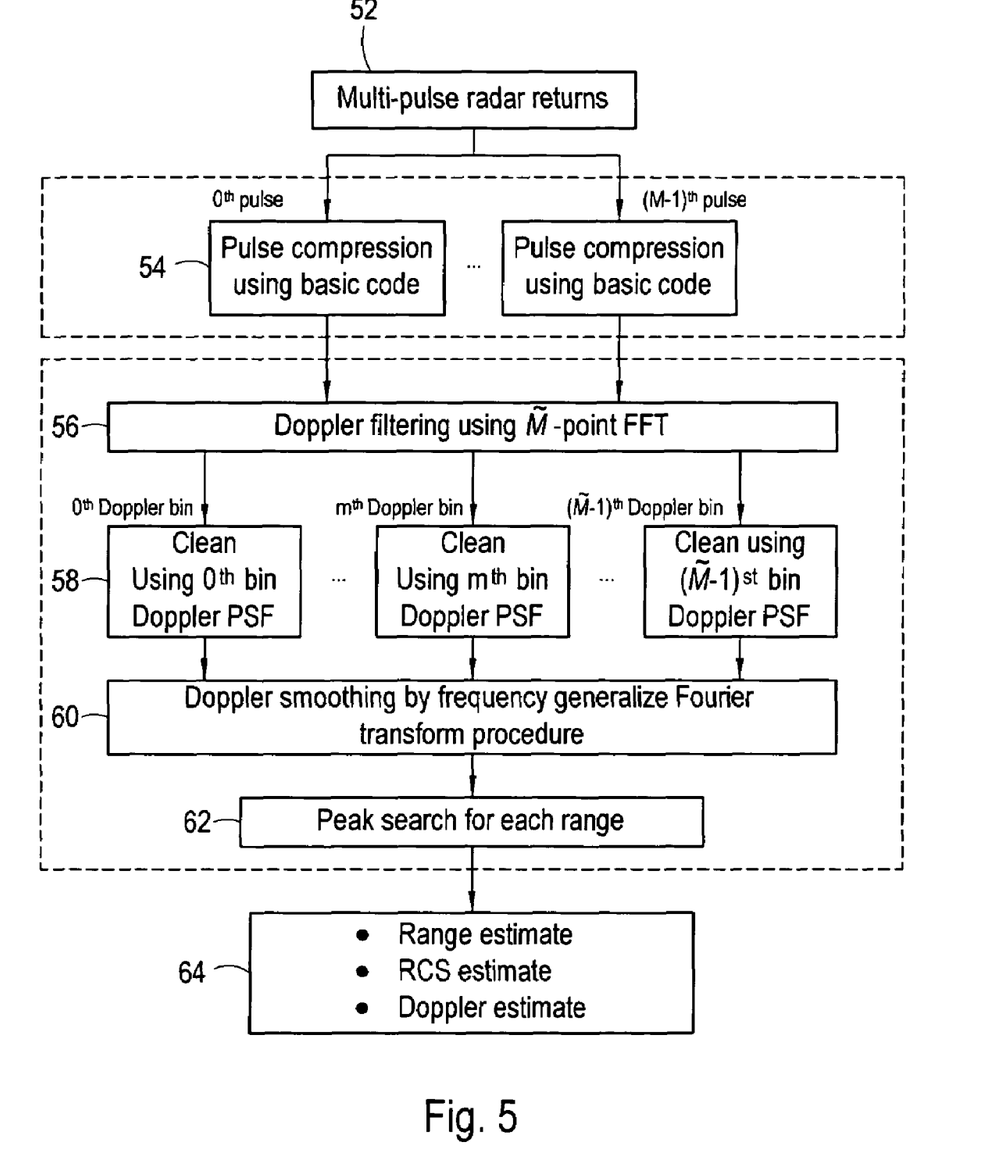
FIG. 5 shows a flowchart architecture for employing the Generalized Fourier Transform procedure using the Doppler-PSF.

FIG. 5 shows the signal flow diagram for an implementation of the system 20 which combines the Generalized Fourier Transform procedure with Doppler smoothing using the Frequency Generalized Fourier Transform procedure. Specifically, as shown, multi-pulse radar data (box 52) is received and processed by a radar system (box 54). Specifically, in box 54, pulse compression using basic code is performed on each of M pulses. Next, each pulse is Doppler filtered (box 56). Next, each Doppler filter output (i.e. Doppler bins {0-($\tilde{M}$-1)}) is processed using the Generalized Fourier Transform procedure (box 58). Since a Doppler-PSF is generated by a point scatterer, the amplitude and frequency of a scatterer can be identified by the peak of a shifted and scaled Doppler-PSF. Thus, after smoothing in the Doppler domain by the Frequency Generalized Fourier Transform procedure (box 60), each range bin is searched for peaks (box 62). Specifically, a threshold detection rule can be applied to peaks to decide if targets are present at each range bin. A target range, size and velocity can be identified for each detected target (box 64).

Figure 6:
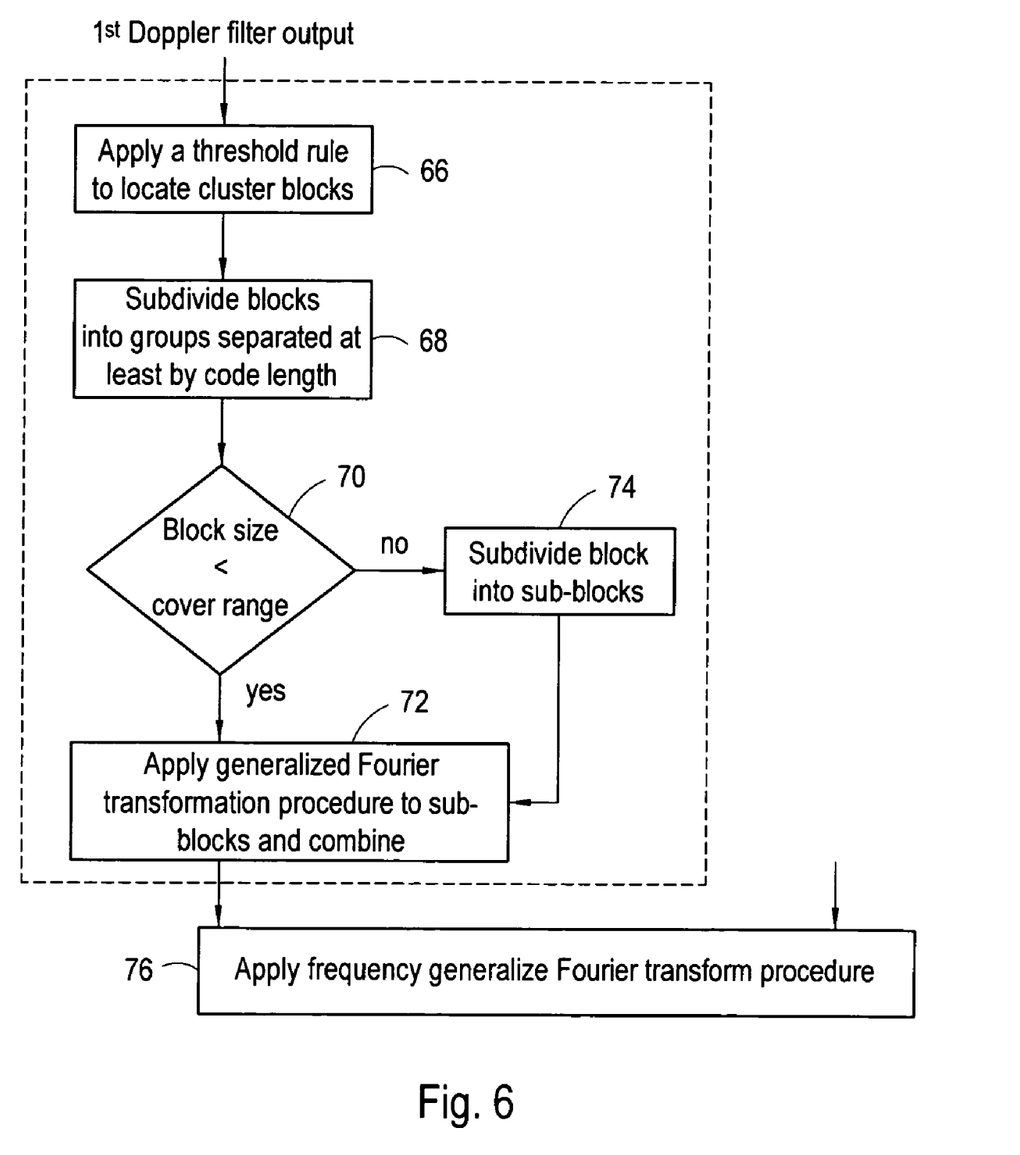
FIG. 6 shows a flowchart architecture illustrating a Block Generalized Fourier Transform procedure.

As described above, the Block Generalized Fourier Transform procedure uses shifted PSFs and correlation matrix that are pre-computed to facilitate time-sidelobe reduction. In some cases, the cover region of the Block Generalized Fourier Transform procedure may be too small depending on the target cluster size. For this case, a cluster grouping technique can be used. Specifically, for this technique, a large cluster of radar returns can first be divided into a plurality of clusters, with each cluster having an appropriate size. Next, the Block Generalized Fourier Transform procedure is applied to these sub-divided clusters one-by-one and the resultant "cleaned" clusters are then recombined. The grouping procedure is illustrated in FIG. 6. As shown, for each Doppler filter output, the procedure locates cluster blocks by applying a threshold rule (box 66). Next, blocks are subdivided (box 68) if the samples in the block are separated by low power samples (at least by the code length). This guarantees that any part of the time-sidelobes of a scatterer belonging to a block is not included in the other sub-blocks. As shown in box 70, if the block size is shorter than the range of the pre-computed PSFs, the Block Generalized Fourier Transform procedure is applied to such a block (box 72). On the other hand, box 70 shows that if the block size is larger than the size of the cover range, the block is divided into sub-blocks (box 74) of an appropriate size that is smaller than the range of the pre-computed PSFs, and the Block Generalized Fourier Transform procedure is applied to each sub-block. Box 72 also shows that the cleaned data is then sorted and recombined. The Frequency Generalized Fourier Transform procedure can be applied (box 76) to the combined data of the "cleaned" time-sidelobes from Doppler filters to "clean" the sidelobes of Doppler filters.

While the particular system and method for sidelobe reduction using point spread function expansion as herein shown and disclosed in detail are fully capable of obtaining the objects and providing the advantages herein before stated, it is to be understood that they are merely illustrative of the presently preferred embodiments of the invention and that no limitations are intended to the details of construction or design herein shown other than as described in the appended claims.

What is claimed is:

1. A method for detecting a plurality of targets, said method comprising the steps of:
   transmitting a coded pulse signal for scattering by each target to generate a return signal;
   receiving said return signal;
   applying pulse compression to said return signal to create a pulse-compressed signal;
   expanding said pulse-compressed signal to a generalized Fourier expansion expression, said expression being a summation of terms, with each term including a point spread function and a complex coefficient; and
   processing said complex coefficients to detect said targets.

2. A method as recited in claim 1 wherein said coded pulse signal has a pseudo-random coded waveform.

3. A method as recited in claim 1 wherein said coded pulse signal has a linear frequency modulated waveform.

4. A method as recited in claim 1 wherein each said complex coefficient has an amplitude component and a phase component.

5. A method as recited in claim 1 wherein a constant false alarm rate (CFAR) technique is used to process said complex coefficients and detect the targets.

6. A method as recited in claim 1 further comprising the step of identifying a range and radar cross section for each target.

7. A method as recited in claim 1 wherein each said point spread function is generated in two-dimensional (range× Doppler) space.

8. A method as recited in claim 1 wherein said signal expansion step includes the step of calculating a covariance matrix for a point spread function.

9. A method as recited in claim 8 wherein said calculating step is performed in real time.

10. A method as recited in claim 8 wherein said calculating step is performed off-line.

11. A method for detecting a plurality of targets, said method comprising the steps of:
    transmitting a coded pulse signal for scattering by each target to generate a return signal;
    receiving said return signal;
    applying pulse compression to said return signal to create a pulse-compressed signal;
    developing an expansion expression, said expression being a summation of terms, with each term including a point spread function and a complex coefficient;
    applying said expansion expression to said pulse-compressed signal to optimize said complex coefficients; and
    processing said complex coefficients to detect said targets.

12. A method as recited in claim 11 wherein said expansion expression is a function of range, and said applying step produces a set of complex coefficients, with each complex coefficient corresponding to a specific range.

13. A method as recited in claim 12 wherein said processing step is accomplished by:
    calculating a magnitude for each complex coefficient; and
    comparing the magnitude for each complex coefficient to a threshold value to a set of ranges in which targets are detected.

14. A method as recited in claim 13 wherein said comparing step is accomplished using a constant false alarm rate (CFAR) technique.

15. A method as recited in claim 11 wherein said expansion expression is a function of range and Doppler frequency, and said applying step produces a set of complex coefficients, with each complex coefficient corresponding to a specific range.

16. A radar system for detecting a plurality of targets, said radar system comprising:
    a transmitter for transmitting a coded pulse signal for scattering by each target to generate a return signal;
    a receiver for receiving said return signal and creating a pulse-compressed signal therefrom;
    a means for expanding said pulse-compressed signal to a generalized Fourier expansion expression, said expression being a summation of terms, with each term including a point spread function and a complex coefficient; and
    a processing means for detecting said targets from said complex coefficients.

17. A radar system as recited in claim 16 wherein said coded pulse signal has a pseudo-random coded waveform.

18. A radar system as recited in claim 16 wherein said coded pulse signal has a linear frequency modulated waveform.

19. A radar system as recited in claim 16 wherein each said complex coefficient has an amplitude component and a phase component.

20. A radar system as recited in claim 16 wherein a constant false alarm rate (CFAR) technique is used to process said complex coefficients and detect the targets.

* * * * *